UNITED STATES PATENT OFFICE.

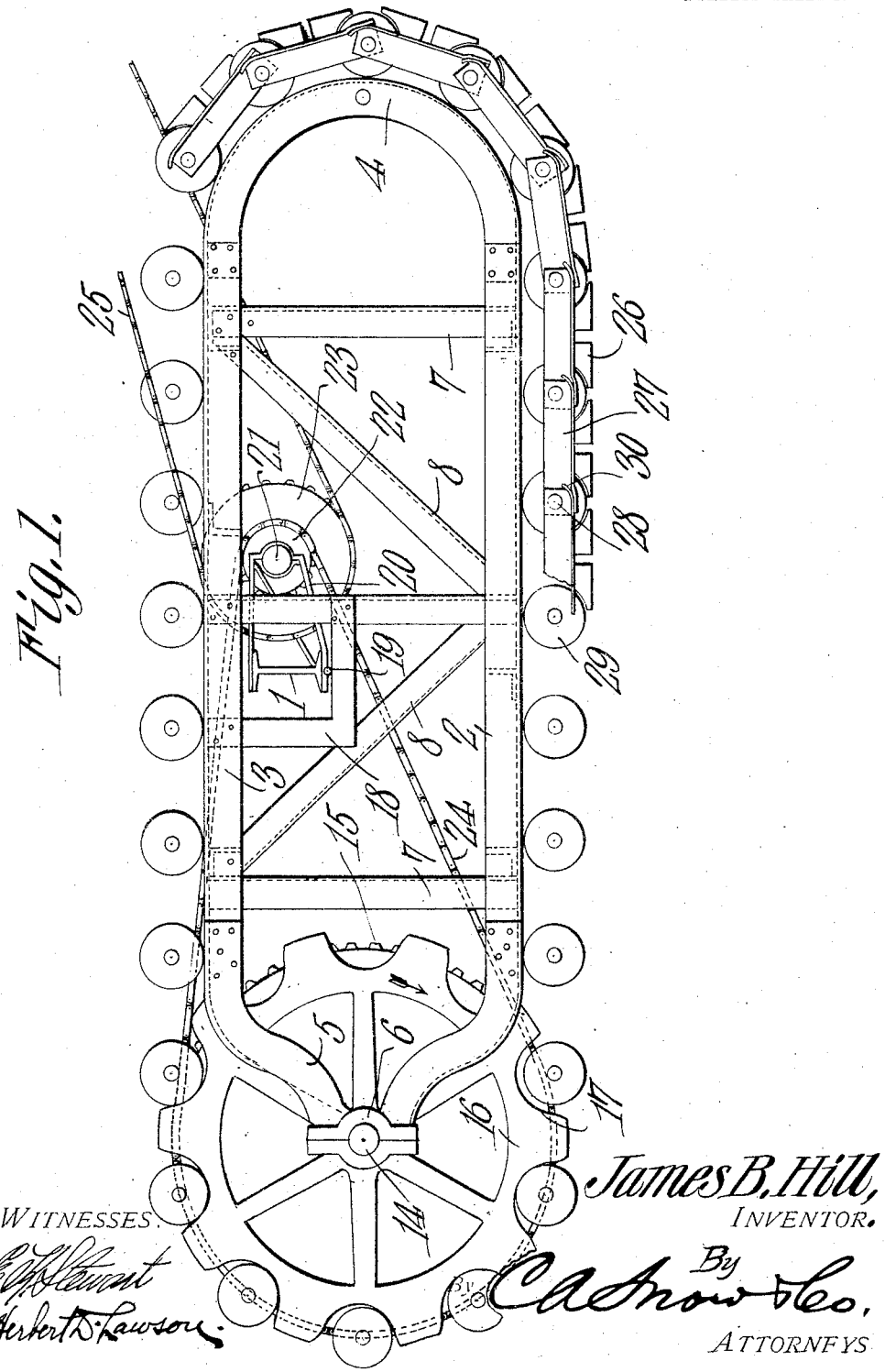

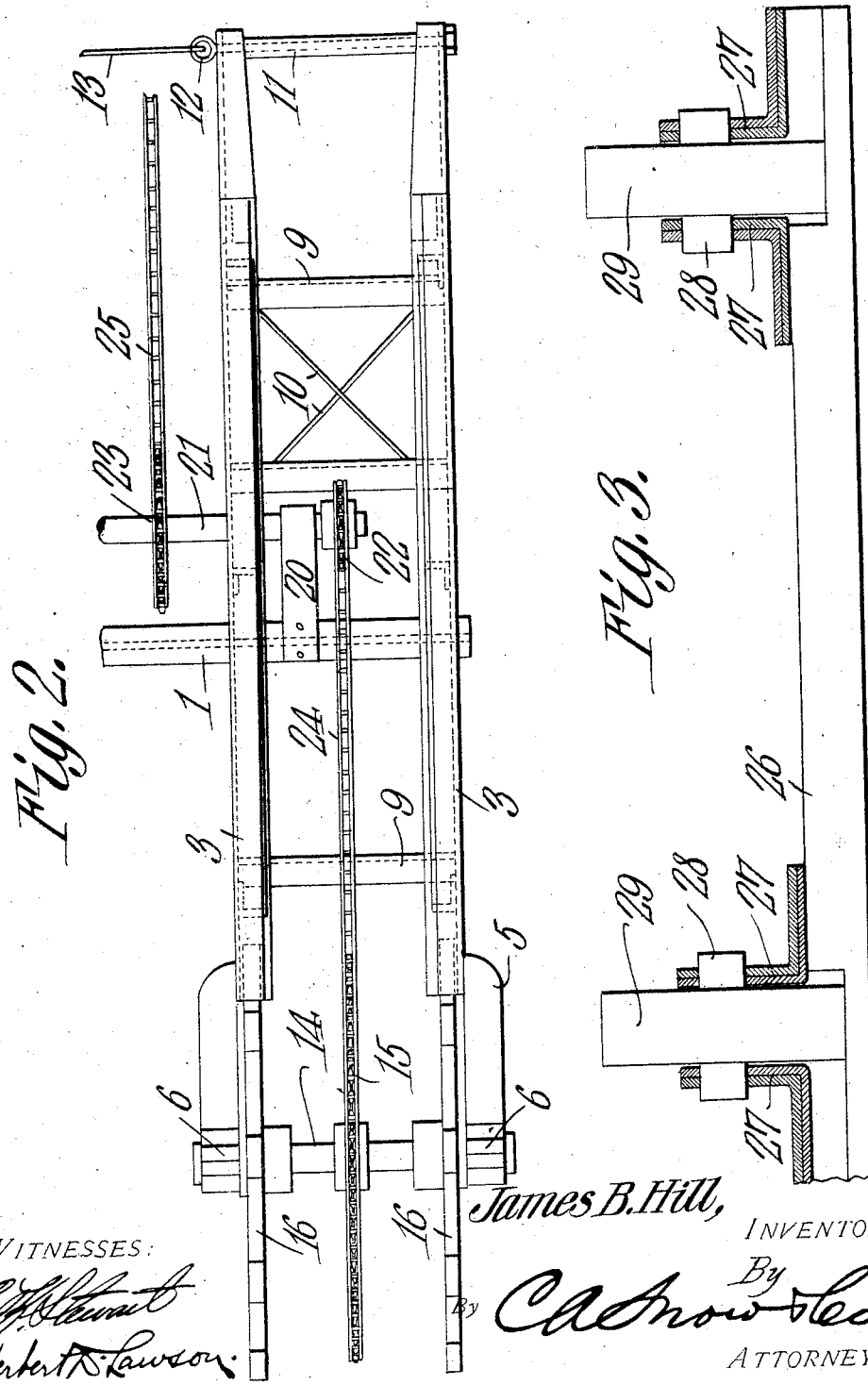

JAMES B. HILL, OF FINDLAY, OHIO.

TRACTION-APRON.

No. 866,647.

Specification of Letters Patent.

Patented Sept. 24, 1907.

Application filed March 30, 1907. Serial No. 365,548.

*To all whom it may concern:*

Be it known that I, JAMES B. HILL, a citizen of the United States, residing at Findlay, in the county of Hancock and State of Ohio, have invented a new and useful Traction-Apron, of which the following is a specification.

This invention relates to traction aprons designed for use as a substitute for the usual traction wheels.

The object of the invention is to provide a device of this character especially designed for use upon soft or marshy soil where heavy machinery such as the ditching machine covered in my application for United States Letters Patent (filed Mar. 8, '07, Serial No. 361,387) is used.

Another object is to provide a traction apron which presents a broad surface to the ground and which is so shaped as to readily pass over projections in the path thereof.

A still further object is to provide an apron made up of a plurality of traction shoes each of which constitutes a support for an anti-friction device designed to receive the weight of the machine.

Another object is to so connect the traction apron to the machine as to permit the same to be readily shifted for the purpose of steering the machine.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of one of the traction aprons and the runner therein, a portion of the apron being broken away; Fig. 2 is a plan view of the runner and the drive sprockets of the apron, said apron being removed for the sake of clearness; and Fig. 3 is an enlarged transverse section through a portion of the apron.

Referring to the figures by characters of reference, 1 designates an I-beam constituting the axle of a machine and each end of this axle is provided with a traction apron and runner such as hereinafter described. Each runner consists of a lower angle iron 2 of suitable length and an upper angle iron 3 connected at their forward ends by a semi-circular coupling member 4 while the rear ends of these angle irons converge as at 5 and are connected by a box 6. Vertical and diagonal braces 7 and 8 respectively connect the upper and lower angle irons so that a rigid frame capable of supporting a considerable weight is produced. As shown in Fig. 2 two of these frames are provided for each runner, said frames being connected at desired intervals by cross beams 9 suitably braced as at 10. A coupling bar 11 also preferably connects the front portions of the members 4 and has an eye 12 at its inner end connected by means of a rod 13 with suitable steering mechanism not shown. The boxes 6 of the two frames constitute bearings for a shaft 14 upon the intermediate portion of which is secured a sprocket 15. Propelling wheels 16 are secured to the end portions of the shaft 14 and directly in rear of the angle irons 2 and 3. These propelling wheels have notches 17 in their peripheries which are for the purpose hereinafter disclosed. An angular bracket 18 is secured within each frame of the runner the same being preferably fastened to the angle iron 3 and to one of each of the braces 7 and 8. The axle 1 is supported by these brackets and is designed to move backward and forward therein for a limited distance this movement being facilitated by an anti-friction device such as a roller 19 which is interposed between the axle 1 and the brackets 18. By providing this roller it is obvious that the runner is capable of tilting in relation to the axle and of having a slight independent longitudinal movement.

Extending from the axle 1 at a point between the two frames of the runner is a bracket 20 in which is journaled a shaft 21 carrying sprockets 22 and 23 both of which are keyed or otherwise secured to the shaft. Sprocket 22 is disposed in alinement with the sprocket 15 and is designed to drive a chain 24 extending over the two sprockets while sprocket 23 is arranged beyond the runner and is disposed to receive motion from a suitable motor through a chain 25. The runner is surrounded by a traction apron of novel construction and which consists of a plurality of pivotally connected traction shoes. Each of these shoes is formed of one or more cross ties 26 of wood or other suitable material and secured to each end portion of the tie or ties of each shoe are oppositely disposed angle irons 27 the upstanding portions of which constitute bearings for the trunnions 28 of an anti-friction roller 29. These angle irons project beyond the ties 26 and the ends of the irons of adjoining shoes lap as shown particularly in Figs. 1 and 3. These lapping portions receive the trunnions 28 and therefore not only constitute bearings for said trunnions but are also pivotally connected by the trunnions. The bottom or horizontal portions of the angle irons 27 also lap and are preferably curved as shown at 30 in Fig. 1 so that bending of the apron in passing around the members 4 is permissible. The notches 17 in wheels 16 are spaced apart so as to successively receive the rollers 29. As has heretofore been stated the wheels 16 are disposed directly in rear of the angle irons 2 and 3 and in order that these wheels may be so located the converging portions 5 of the angle irons are offset as shown in Fig. 2.

It is thought that the operation of this traction apron will be fully understood from the foregoing description when read in connection with the accompanying drawings. One of these aprons is provided as a substitute for each of the four traction wheels usually employed, and motion is imparted to the apron through chains 25 and 24, sprockets 22, 23, and 15 and wheels 16. By driving wheels 16 in the direction indicated by the arrow in Fig. 1 said wheels travel forward upon the rollers 29 pushing the runner ahead of it and causing the shoes of the apron to move downward from the members 4 and onto the ground successively. Said runner will therefore travel forward upon the rollers as they are successively placed in position in front thereof. As each shoe is of considerable breadth the apron will support heavy machinery upon soft or marshy soil and as the front portion of the apron is rounded it is obvious that the same can be readily guided over obstructions in the path thereof. As the axle 1 is movably mounted upon each runner it is apparent that said runner can be shifted laterally for the purpose of guiding the machine supported thereby. Should any one of the shoes of the apron become broken or worn the same can be removed and a new one substituted therefor.

It will be seen that this traction apron is very simple and durable in construction and constitutes an efficient means for propelling heavy machinery upon soft soil.

What is claimed is:

1. The combination with an axle; of a traction device comprising a runner, an anti-friction bearing interposed between the runner and axle, a traction apron movable around the runner, and anti-friction devices interposed between the apron and runner.

2. A traction device comprising rigidly connected runners, an axle projecting into and movably supported at one end by the runners, pivotally connected cross ties extending under the runners, anti-friction devices carried by the end portions of the ties and bearing against the runners, a shaft journaled within the runners, revoluble means carried thereby for engaging and simultaneously actuating the anti-friction devices, a drive shaft projecting between the runners, and means interposed between said runners for transmitting motion from the guide shaft to the first mentioned shaft.

3. The combination with an axle; of a traction device supporting one end of said axle, said device comprising a runner, anti-friction means interposed between the runner and axle, a traction apron movable around the runner, and anti-friction devices interposed between the apron and runner.

In testimony that I claim the foregoing as my own, I have hereto affixed my signature in the presence of two witnesses.

JAMES B. HILL.

Witnesses:
E. HUME TALBERT,
C. WARRINER.